United States Patent [19]

Dignan

[11] Patent Number: 4,462,486
[45] Date of Patent: Jul. 31, 1984

[54] FOLDING FOOT STEP

[75] Inventor: Donald J. Dignan, South Euclid, Ohio

[73] Assignee: The Eastern Company, Cleveland, Ohio

[21] Appl. No.: 456,361

[22] Filed: Jan. 7, 1983

[51] Int. Cl.³ .............................................. B60R 3/02
[52] U.S. Cl. .................................... 182/91; 280/166
[58] Field of Search ...................... 182/89, 90, 91, 92, 182/97, 98; 248/308; 280/166, 163

[56] References Cited

U.S. PATENT DOCUMENTS

| 120,517 | 10/1871 | Henry. | |
|---|---|---|---|
| 865,375 | 9/1907 | Frye | 182/91 |
| 1,917,336 | 7/1933 | Spitz. | |
| 2,158,949 | 5/1939 | Sarles | 182/91 |
| 2,653,036 | 9/1953 | Creel | 182/91 |
| 2,678,832 | 5/1954 | Wright | 182/89 |
| 3,068,958 | 12/1962 | McCann | 182/89 |
| 3,627,350 | 12/1971 | Cross | 182/91 |
| 3,716,254 | 2/1973 | Tarvin | 182/91 |
| 3,986,503 | 9/1975 | Le Guillon | 182/89 |
| 4,029,355 | 6/1977 | Wilhelmsen | 182/91 |

FOREIGN PATENT DOCUMENTS 17121  8/1908  United Kingdom .................. 182/91

OTHER PUBLICATIONS

Catalog, Eberhard Manufacturing Co., Section 6, p. 3, 1978, Cleveland, Ohio.

Primary Examiner—Reinaldo P. Machado
Attorney, Agent, or Firm—Watts, Hoffmann, Fisher & Heinke

[57] ABSTRACT

A new and improved folding step especially useful on trucks or rail transit vehicles. The folding step includes a support bracket, a step member pivoted to the bracket, and a spring urging the two together and into one of two pivoted positions. The step member has parallel arms that straddle a box-like portion of the bracket. Stub shafts extend from the arms into the bracket through slots and carry cams that are urged into contact with the bracket by the spring. The cams and spring provide an over-center snap action between the step member and bracket.

9 Claims, 10 Drawing Figures

1

FOLDING FOOT STEP

DESCRIPTION

1. Technical Field

This invention relates to a foot step and is particularly directed to a folding step adapted for use on a vehicle such as a truck or a rail transit vehicle to provide a convenient means to ascend or descend the vehicle.

2. Background Art

Large vehicles, such as trucks, rail transit cars, campers and trailers, require some means to facilitate climbing up and down the vehicle. Various devices have been designed to facilitate such climbing, including removable, retractable and foldable steps.

One type of folding step, manufactured in several models by the Eberhard Manufacturing Company of Cleveland, Ohio, a division of The Eastern Company, the assignee of the present application, has a step pad with a projecting stem supported by a mounting bracket. The stem has outwardly extending stub shafts pivotably received by the mounting bracket to allow pivoting of the step between an upright storage position and a projecting use position. A flat leaf spring in the bracket acts against the end of the projecting stem and biases the step into the storage and use positions with an over-center snap action.

DISCLOSURE OF THE INVENTION

In accordance with this invention, there is provided a new and improved folding foot step for use on trucks, rail transit vehicles and the like. The new and improved folding foot step is designed to provide improved strength and a positive action when the foot step is pivoted between an extended use position and a folded non-use or storage position.

A step apparatus constructed in accordance with the present invention comprises a bracket, a step member and a spring. The step member is pivotally mounted to the bracket for movement between folded and extended positions relative to the bracket. The spring is connected between the bracket and the step member to urge the two together under force at the pivotal interconnection. A cam surface carried by the step member continuously acts against the bracket under the force of the spring and is shaped to increase the spring force during pivoting of the step member from either the folded or extended positions.

In the preferred embodiment of the invention, the bracket includes a rigid box housing and the step member includes supporting arm portions on opposite sides of the housing from which inwardly directed stub shafts extend, pivotably supported in the box housing of the bracket. A coil tension spring holds the bracket and step member together with the stub shafts of the step member in elongated grooves of the box housing. A cam is fixed to each stub shaft and the cams and spring produce an over-center snap action during pivoting of the step member, which holds the step member securely in either pivoted position.

The stub shafts of the step member are coaxial, of relatively large diameter, and are relatively widely spaced, which provides high stability and load-bearing strength.

Use of a stiff coil tension spring arranged to urge the cams against the box housing of the mounting bracket provides a strong holding force while allowing use of cams that produce a relatively large moment arm through which the spring force acts. The coil spring facilitates the long moment arm of the cams without the permanent deformation that a stiff leaf spring would incur in arrangements of the type used in prior step devices and without the loss of holding power that would result with a flexible leaf spring under slight distortion at the fully pivoted positions of the step.

The box bracket design serves effectively to both receive the cams and spring and also to resist distortion from a load applied to the step member in use by virtue of its high section modulus. It thereby improves the overall strength of the step assembly. The bracket is constructed to engage the step member when the member is pivoted into the upright stored position to prevent the step member from contacting the vehicle. This prevents damage to the vehicle and aids the operator in grabbing the step to pivot it from a storage to a use position.

The above and other features and advantages of the invention will become better understood from the detailed description of the preferred embodiment that follows, which is described with reference to the accompanying drawings.

BEST MODE FOR CARRYING OUT THE INVENTION

Figure 1:
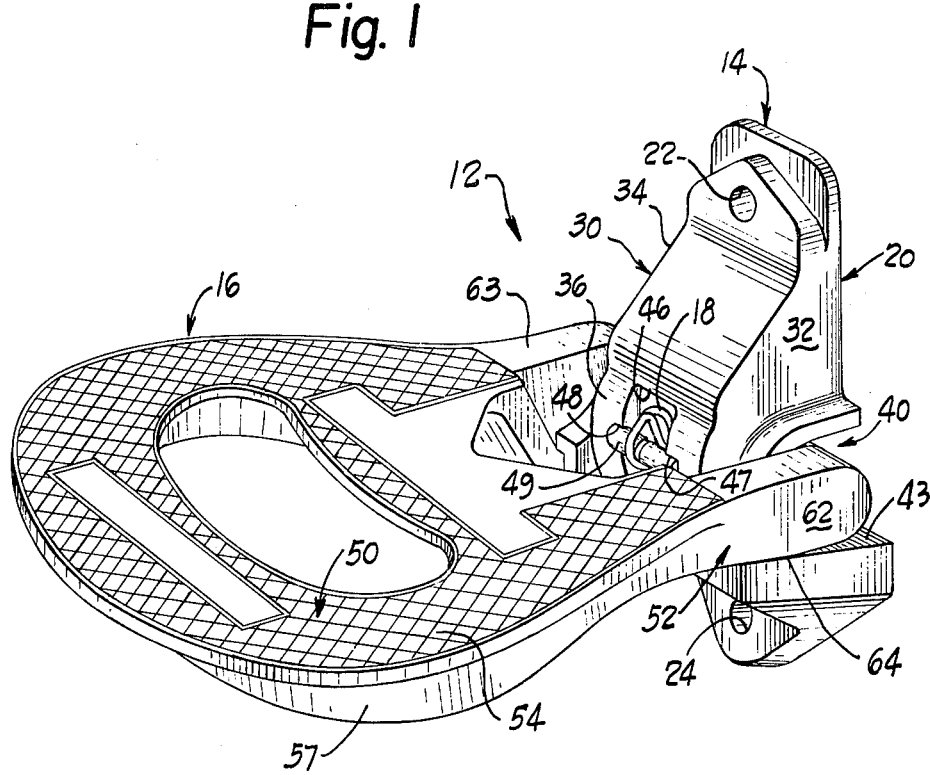
FIG. 1 is a perspective view of a folding step made in accordance with the present invention with the step in the use position.
Figure 3:
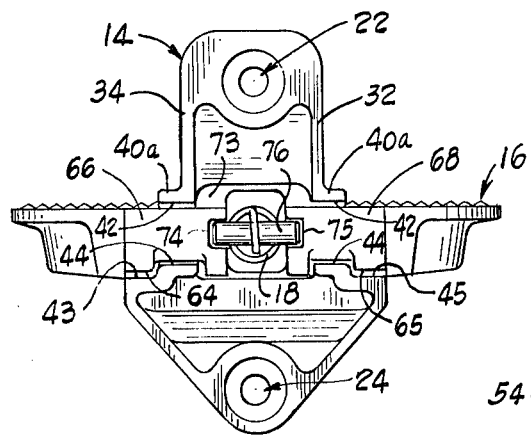
FIG. 3 is a rear elevational view of the folding step in accordance with the present invention with the step in the use position.
Figure 8:
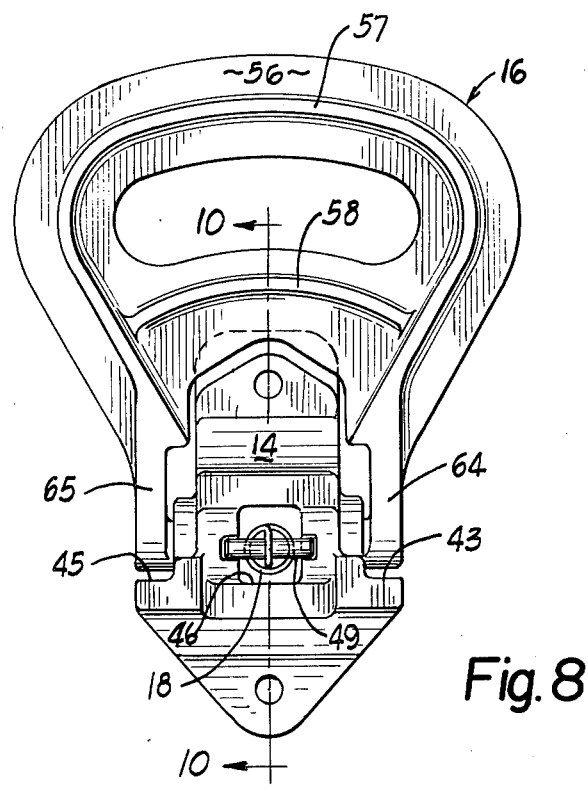
FIG. 8 is a front elevational view of the folding step with the step in the storage position.

A preferred embodiment of the present invention is illustrated by the Figures of the drawings. A step assembly 12 is shown for use on vehicles, such as trucks, rail transit vehicles, and the like. The step assembly 12 includes a bracket member 14, a step member 16, and a spring 18. The step member 16 is pivotally supported by the bracket 14 and the members 14 and 16 are urged together by the spring 18. The step assembly is oriented in the positions shown when mounted on the vertical side of a vehicle in the intended manner. The step member is pivotable between a first or open position shown in FIG. 1 for use and a second or closed position shown in FIG. 8 for storage.

Figure 2:
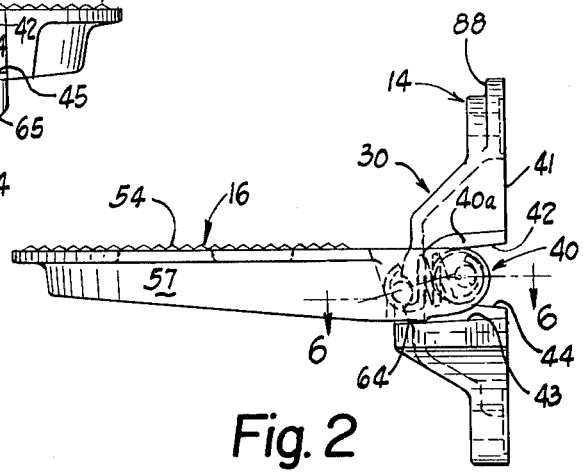
FIG. 2 is a side elevational view of the folding step in accordance with the present invention, with the step in the use position.
Figure 6:
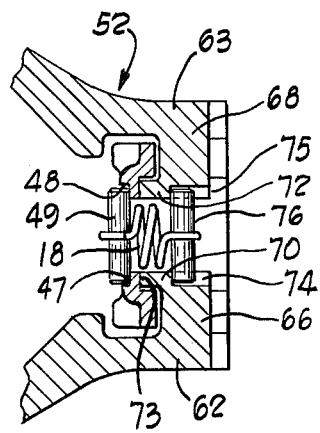
FIG. 6 is a partial sectional view taken along line 6—6 of FIG. 2.

The bracket member 14 has a base portion 20 having spaced mounting holes 22, 24 adapted to receive mounting bolts, not shown, to mount the bracket member 14 to the side of a vehicle or the like, not shown. The bracket member 14 also includes a box portion 30 extending forward from the base portion and having side walls 32, 34 and a front wall portion 36, which is spaced from and parallel to the base portion 20. A U-shaped opening 40 in each side wall 32, 34 extends from a back surface 41 of the bracket toward the front wall portion 36, each opening being horizontally aligned with the other in the orientation shown and having upper and lower, slightly coverging, surfaces 42, 44 (FIG. 2). A laterally extending flange 40a extends along the periphery of the opening 40 providing increased area to the surfaces 42, 44 along the opening. A horizontal flange-like surface 43, 45 extends laterally outward from each side wall 32, 34 below the lower surface 44 of each opening 40 and serves as a support for the step member when it is in the open position. There is a central opening 46 in the front wall portion 36 substantially horizontally aligned with the openings 40 and centered between the side walls 32, 34, through which a portion of the spring 18 passes. Two recessed concave seats 47, 48 (FIGS. 1 and 6), in the front surface of the front wall, one on each side of the central opening 46, locate a spring-retaining pin 49 that extends horizontally across the opening 46.

The step member 16 has a relatively wide foot-receiving portion 50, or so-called foot pad, of a shape and size to support the front foot portion of the user, and a narrower mounting portion 52 that coacts with the bracket member 14. The top surface of the portion 50 has an anti-skid surface 54 having protruding diamond-shaped elements in the surface to increase the coefficient of friction across the surface. The bottom side 56 of the support portion 50 includes webs 57, 58 designed to increase section modulus and hence strength of the support portion 50 with a minimum of additional weight.

The mounting portion 52 is comprised of two parallel arms 62, 63 projecting from the foot-receiving portion and generally coplanar therewith, spaced to straddle the box portion 30 so each arm is closely adjacent a side wall 32, 34. With the step member in an open position, lower surfaces 64, 65 of the arms rest against the flange-like horizontal surfaces 43, 45 of the bracket member. Integral stub shafts 66, 68, circular in cross-section, extend inwardly from the arms 62, 63 through the openings 40 with a clearance fit. The stub shafts rotate within and reciprocate along the U-shaped slots 40 when the step is pivoted, and rest against the upper surfaces 42 formed in part by the flanges 40a when the step is in an extended, use position. The surfaces 42, along with the surfaces 43, 45 that coact with the step surfaces 64, 65, limit pivotal movement of the step member 16 beyond the horizontal and have sufficient strength to resist high loads.

Each of the stub shafts 66, 68 carries an integral cam 70, 72, respectively, that extends toward and continually acts on opposite sides of the central opening 46 against the inside surface 73 (FIGS. 6, 9 and 10) of the front wall 36 of the box portion 30 regardless of the position of the step. The cams are elongated and narrow and have two flats 82, 84 at the end, at right angles to each other. One or the other flat contacts the inside surface 73 of the bracket member when the step member is in either the extended or folded position, as illustrated in FIGS. 9 and 10.

Each of the stub shafts 66, 68 has an open ended groove 74, 75 (FIG. 6), respectively, at the end of the shaft, in which a spring retaining pin 76 is received that spans the distance between the shafts. The coil spring 18 is secured at opposite ends to the pins 49, 76 in circumferential pin grooves 78, 80 of the respective pins and urges the pins and hence the bracket and step members toward each other.

Figure 9:
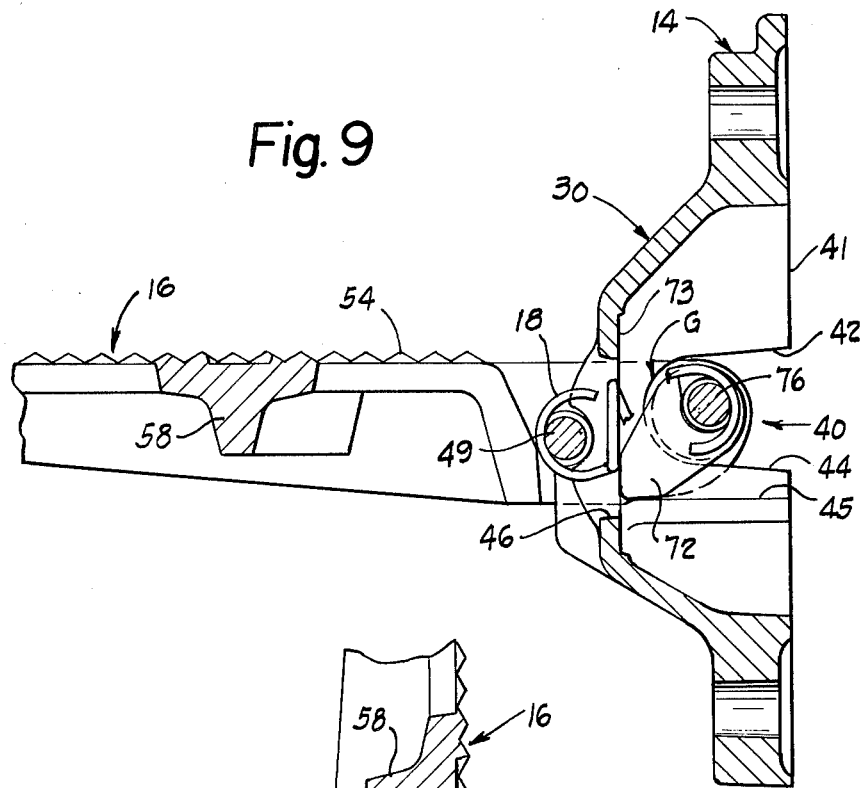
FIG. 9 is a partial sectional view taken along line 9—9 of FIG. 4.
Figure 10:
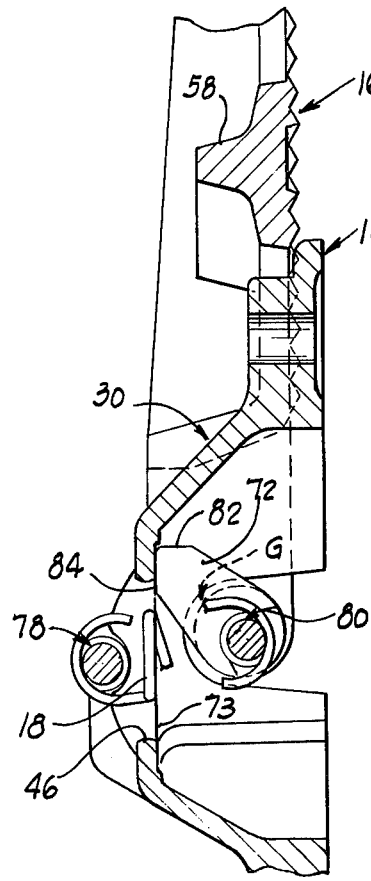
FIG. 10 is a partial sectional view taken along line 10—10 of FIG. 8.

As best shown in FIGS. 9 and 10, the cams 70, 72 prevent the shafts 66, 68 from reaching the closed ends of the U-shaped openings 40, so the spring 18 always presses the cams against the bracket member. Thus, there is always a slight gap G between the shafts and the closed ends of the openings 40. By virtue of the cam shape and the gaps G, the cams and spring firmly, but yieldably, resist pivoting of the step member relative to the bracket member from either the extended or folded positions so there is no looseness or play between the parts in either position, yet close part tolerances are not required. The shape and orientation of the cams serves to increase the spring tension during initial pivoting of the step member from either the folded or extended position.

Figure 5:
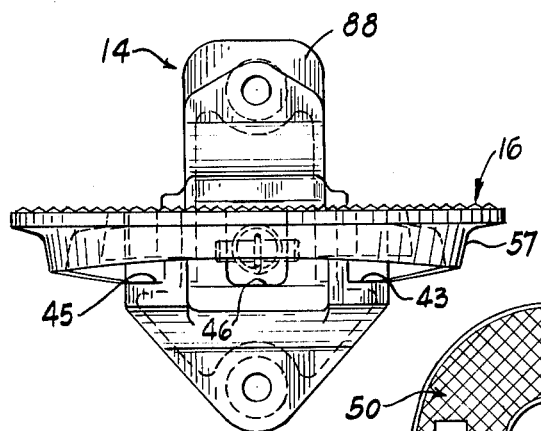
FIG. 5 is a front elevational view of the folding step with the step in the use position.
Figure 4:
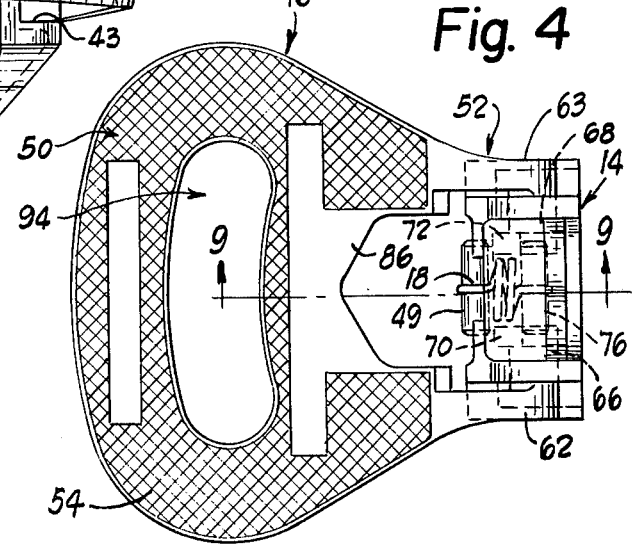
FIG. 4 is a top plan view of the folding step in accordance with the present invention with the step in the use position.
Figure 7:
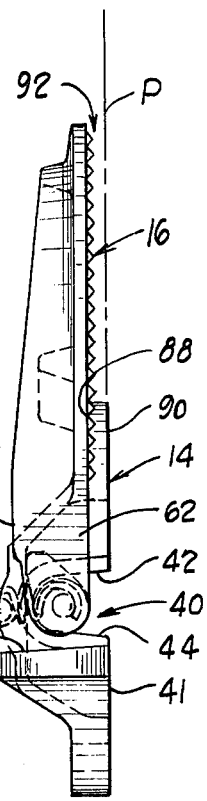
FIG. 7 is a side elevational view of the folding step with the step in the storage position.

A surface portion 86 (FIG. 4) of the step member 14 and a portion 88 (FIGS. 5 and 7) of the bracket member 12, respectively, act as storage position stops. In the storage or folded position, the surface portion 86 contacts the surface portion 88. The position of the cam members 70, 72 with respect to the stub shafts 66, 68 in combination with the bias force of the spring 19 cause a continual pressure to be applied between the stop surfaces 86, 88 that resists rattling between the members while the vehicle, to which the assembly is fixed, travels. The thickness of the bracket member 14 between the front stop surface portion 88 and the back mounting surface 90 creates a gap 92 (FIG. 7) between the step member 16 and a plane P defined by the surface 90. In use, this plane would typically be a body surface of the truck or other vehicle, with the gap facilitating the user's hand to more easily grab the step member to pivot it from the storage to the use position. An opening 94 is provided in the support surface 50 to also facilitate the user's hand.

While a preferred embodiment of the invention has been described in detail, various modifications or alterations may be made therein without departing from the spirit and scope of the invention set forth in the appended claims.

I claim:
1. A step apparatus comprising:
   a bracket;
   a step member;
   a pivotal interconnection between the bracket and step member;
   a spring connected between the bracket and step member urging the two together under force at the pivotal interconnection; and
   a cam surface carried by the step member, continuously acting against the bracket under the force of said spring, and shaped to increase the spring force during pivoting of the step member relative to the bracket from both a folded and extended position.

2. A step apparatus for use on a support member or the like, said step apparatus comprising:
   a bracket adapted to be fixed to said support member;
   a step member, including means for supporting said step member on said bracket for pivotal movement between first and second positions relative to said bracket; and means including a coil spring acting between the step member and bracket to yieldably resist said pivotal movement with a greater force intermediate said positions than at said positions.

3. A step apparatus for use on a support, said step apparatus comprising:

a bracket adapted to be fixed to said support;

a step member, including means for supporting said step member on said bracket for pivotal movement between first and second positions relative to said bracket, said means allowing relative reciprocable movement between the step member and bracket during pivotal movement; and means including a coil spring acting between the step member and bracket to yieldably resist said pivotal movement with a greater force intermediate said positions than at said positions.

4. A folding step assembly for use on a support, said assembly comprising:

a bracket adapted to be fixed to said support;

a step having members pivotably mounted in said bracket and being pivotable between a first and a second position relative to said bracket;

a spring resiliently holding said members in said bracket; and a cam fixed to said step for increasingly stressing said spring when said step member is initially pivoted from both of said first and said second positions.

5. A folding step assembly as set forth in claim 4 wherein said bracket has a mounting surface and further includes a box housing extending from the mounting surface of said bracket and formed of two side walls and a front wall, each having an opening and wherein portions of the step extend through the side walls and the spring extends through the front wall.

6. A folding step assembly as set forth in claim 5 wherein said step portions are inwardly directed stub shafts extending from parallel mounting arms of said step member.

7. A folding step assembly as set forth in claim 6 wherein a cam is formed as a part of each stub shaft and is positioned to act against an inside surface of said front wall.

8. A folding step assembly comprising:

a mounting bracket for securing the assembly to a support;

a step pivotably and reciprocably supported by said bracket for movement between an extended use position and a folded storage position; and a tension coil spring securing the bracket and step together;

said bracket having a box-like housing with an open back adapted to face the support, two spaced side walls and a front wall, a slot in each side wall extending from the back toward the front wall, terminating adjacent the front wall and aligned one with the other, a lateral flange extending outwardly from each side wall adjacent the slots, and an opening through the front wall through which the coil spring extends;

said step having two parallel arm portions straddling the box-like housing and opposing coaxial shaft portions extending inwardly into the housing through said slots, the diameter or width of the shaft portions being smaller than the length of said slots, and at least one cam on and in fixed relationship with a shaft portion within the housing acting against the front wall, said cam constructed and arranged to keep the shaft portions from reaching the ends of the slots adjacent the front wall and to reciprocate the shaft portions in the slots during pivoting of the step relative to the bracket and said arm portions constructed and arranged to contact said lateral flanges when the step is in the extended use position; and said coil spring and cam arranged to increase the stress on said spring during initial pivotal movement of the step relative to the bracket from either of said use or folded positions.

9. A step apparatus comprising:

a bracket having a mounting surface, a portion extending therefrom, and a recess in the extending portion and opening through the mounting surface;

a step member including a shaft portion received in said recess;

a coil spring acting under tension directly between the bracket and step to urge the shaft portion into said recess and to retain the bracket and step member together; and camming means on said step member for opposing movement of said shaft portion by said spring.

* * * * *